UNITED STATES PATENT OFFICE.

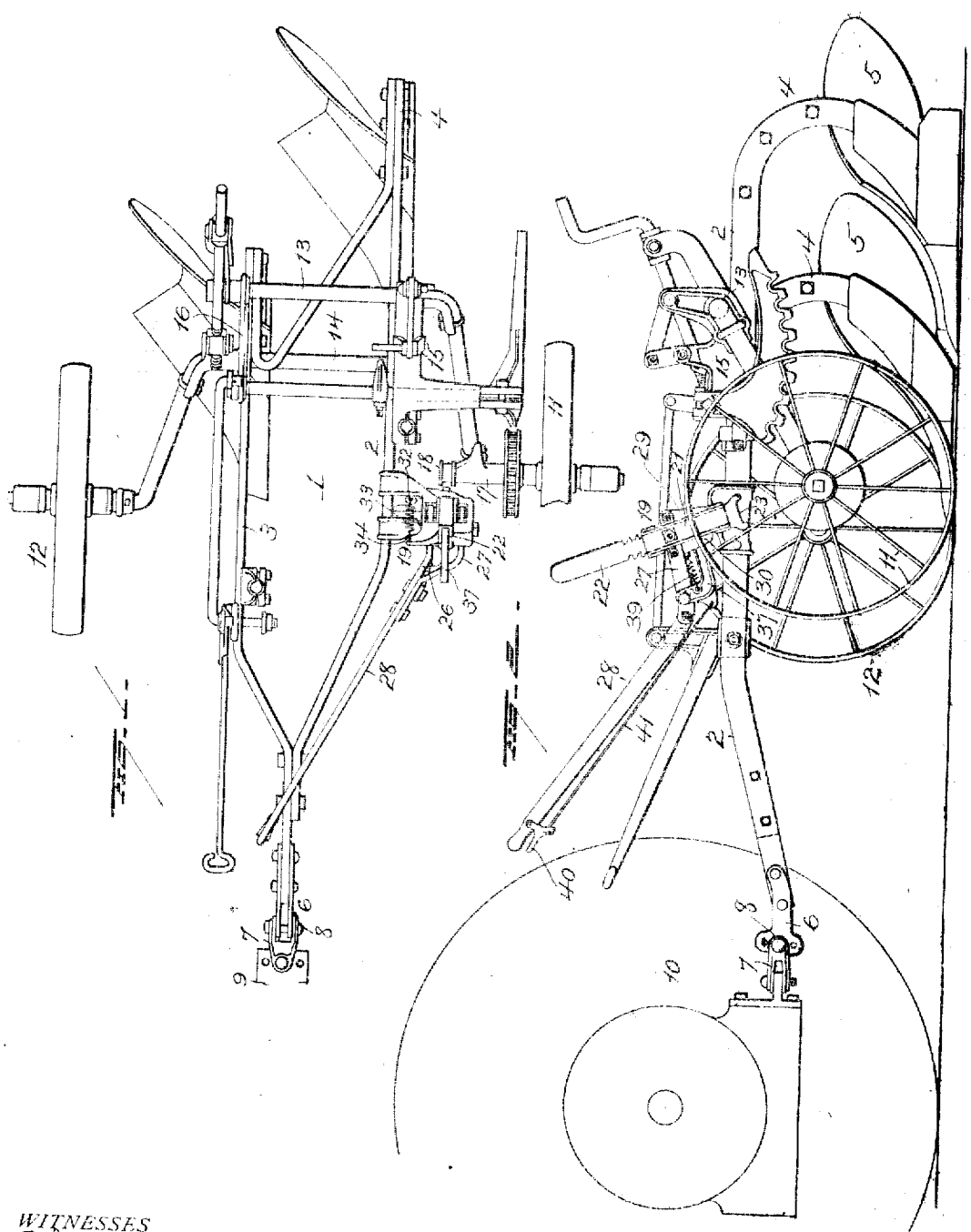

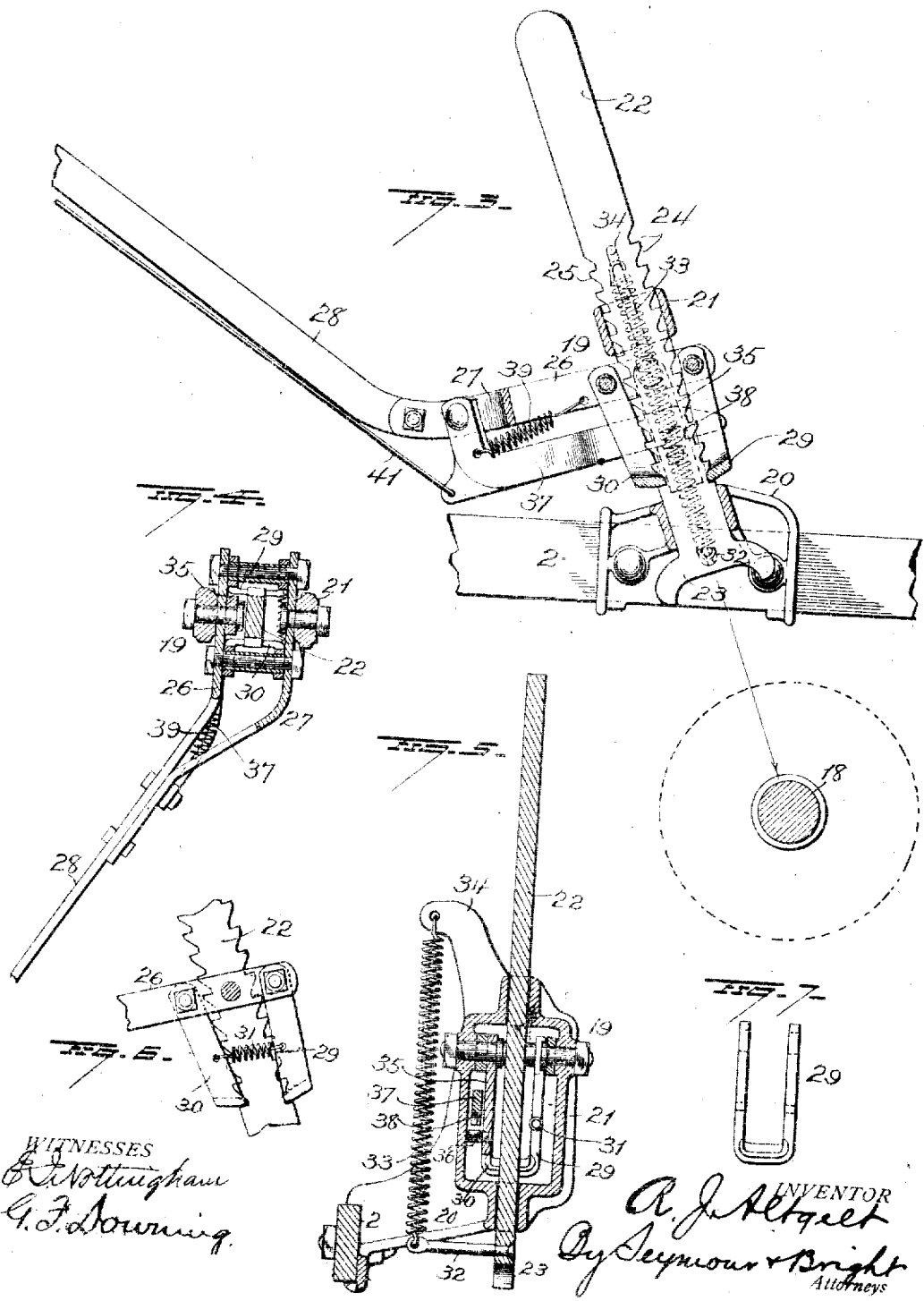

RUDOLPH JOSEPH ALTGELT, OF SOUTH BEND, INDIANA, ASSIGNOR TO OLIVER CHILLED PLOW WORKS, OF SOUTH BEND, INDIANA.

PLOW STRUCTURE.

1,266,754.    Specification of Letters Patent.    Patented May 21, 1918.

Application filed September 29, 1917. Serial No. 193,970.

*To all whom it may concern:*

Be it known that I, RUDOLPH J. ALTGELT, a citizen of the United States, and a resident of South Bend, in the county of Saint Joseph and State of Indiana, have invented certain new and useful Improvements in Plow Structures; and I do hereby declare the following to be a full, clear, and exact description of the invention, such as will enable others skilled in the art to which it appertains to make and use the same.

This invention relates to improvements in plow structures and more particularly to lifting and adjusting means therefor,—one object of the invention being to provide simple and efficient means which may be manually operated to adjust the plow for depth of plowing or for raising and lowering the plow structure.

With this and other objects in view, the invention consists in certain novel features of construction and combinations of parts as hereinafter set forth and pointed out in the claims.

In the accompanying drawings; Figure 1 is a plan view of an engine gang plow embodying my improvements; Fig. 2 is a side elevation, and Figs. 3, 4, 5, 6 and 7 are details.

1 represents a plow frame which, in the structure shown in the drawing, comprises two beams 2, 3 provided at their rear ends with standards 4, to which plow bases 5 are secured. The forward ends of the beams are brought together and securely bolted. One of said beams extends forwardly beyond the other and is provided with a clevis 6 to which a shackle 7 is pivotally and adjustably attached by a horizontal pivot pin 8. This shackle is adjustably connected by a vertical pivot pin to a bracket 9 secured to a tractor or wheeled draft frame 10.

The rear portion of the plow structure is supported on carrying wheels 11 and 12, through the medium of crank axles 13, 14 mounted in brackets 15, 16 secured to the beams of said plow structure. The sleeve or sand band 17 for the crank axle 13 and wheel 11 is extended inwardly from its connection with said crank axle, and provided at its inner end with annular flanges whereby a head 18 is formed.

The sleeve 17 constitutes, in effect, a part of the crank axle 13 and above the head 18 of said sleeve, a jack structure 19 is mounted on the beam 2 of the plow structure and is adapted to coöperate with the headed end of the sleeve 17 of the crank axle 13 to raise the plow manually or to adjust the same for depth of plowing.

The jack structure 19 comprises a bracket 20 securely bolted to the beam 2 and this bracket is formed with an open frame 21 having guide openings at its upper and lower ends for the passage of a vertically movable bar 22,—the latter being provided at its lower end with a recessed head or enlargement 23 to engage the headed end of the sleeve 17 of the crank axle 13. The bar 22 is provided on each of its edges with ratchet teeth 24, 25 whereby said bar 22 is made to form a double ratchet bar.

Arms or members 26, 27 constituting the bifurcated end of a hand lever 28, are pivotally attached to the upper portion of the frame 21 of bracket 20 and to these arms or lever members, dogs 29, 30, made in the form of U-shaped bails, are pivotally attached and depend therefrom so as to engage, respectively, the ratchet teeth of the bar 22,—such engagement being insured by the action of a spring 31 connecting said dogs.

An arm 32 projects laterally from the lower portion of the bar 22 and to this arm, the lower end of a spring 33 is attached, the upper end of said spring being connected with an arm 34 at the upper end of the bracket frame 21 and tends to move the bar upwardly.

A shifting link 35 is loosely hung from the pivot pin of the lever arm and is disposed between the two dogs 29, 30. The shifting link is provided with a laterally projecting pin 36, and a trigger 37 projects over said pin and is provided with a notch 38 to receive the same. The trigger 37 is pivotally attached to the hand lever 28 and is maintained normally out of engagement with the pin 36 by means of a spring 39. A finger lever 40 is attached to the handle end of the lever 28 and connected, by a rod 41, with the trigger 37 for moving the latter into engagement with the pin 36.

When it is desired to raise the plow structure by hand or to adjust the same for depth of plowing, the operator will move the hand lever 28 back and forth (without operating the finger lever 40) and thus cause the dogs to act alternately on the teeth of the respective sets of teeth on the bar 22, to effect the downward movement of said bar,—which latter by coöperation with the sleeve 17 of the crank axle 13 will effect the raising of the plow.

To lower the plow structure, upward movement of the bar 22 is necessary. To effect such upward movement of the lever, the operator will press the finger lever 40 to cause the notched portion of the trigger 37 to engage the pin 36 of the shifting link 35 and then move the hand lever 28 back and forth. The shifting link 35 will now be swung by the trigger and caused to move the dogs alternately out of engagement with the ratchet teeth of the bar 22, thus permitting the spring 33 to move the bar 22 upwardly step-by-step. I do not, in this case, claim the means shown herein for raising the plow structure by power lift means, nor the means for locking-up the plow structure,—these features being embodied in my copending applications Serial Nos. 193,968 and 193,969 respectively.

Various changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. The combination with a plow structure, wheels therefor, and an axle mounted on the plow structure, of a bracket secured to the plow structure, a double ratchet bar vertically movable through said bracket and adapted to coöperate with said axle, a hand lever pivoted to said bracket, pivoted spring actuated dogs hung on said lever for coöperation with said double ratchet bar to move the same in one direction when the hand lever is swung back and forth, means for disengaging said dogs from the ratchet bar, and a spring for moving said bar in the reverse direction.

2. The combination with a plow structure, wheels therefor, and crank axles for said wheels mounted on the plow structure, one of said axles comprising an inwardly projecting sleeve having a head at its inner end, of a bracket secured to the plow structure, a ratchet bar movable through said bracket and having a recessed head to engage the head of said axle sleeve, a hand lever pivoted to said bracket, spring-actuated dogs carried by said lever to engage the ratchet bar, a spring for moving said bar upwardly, and means for disengaging the dogs from the ratchet bar.

3. The combination with a bracket adapted to be secured to a plow structure, of a double ratchet bar movable through said bracket and adapted to engage a part to raise the plow structure, a hand lever pivoted to said bracket, spring-actuated dogs hung on said hand lever and engaging the ratchet bar for moving said bar in one direction when the hand lever is moved back and forth, a spring for moving said bar in the other direction, a pivoted shifting link between said dogs, said link having a laterally projecting part, a spring-sustained trigger pivoted to the hand lever, and means for moving said trigger into engagement with the lateral projection on the shifting link to engage the dogs from the ratchet bar.

In testimony whereof, I have signed this specification in the presence of two subscribing witnesses.

RUDOLPH JOSEPH ALTGELT.

Witnesses:
 EDWIN NICAR,
 CHARLES A. WEBSTER.